United States Patent
Taveniku

(10) Patent No.: US 7,974,637 B1
(45) Date of Patent: Jul. 5, 2011

(54) PASSIVE MODE TRACKING THROUGH EXISTING AND FUTURE WIRELESS NETWORKS

(76) Inventor: Mikael Bror Taveniku, Westford, MA (US)

( * ) Notice: Subject to any disclaimer, the term of this patent is extended or adjusted under 35 U.S.C. 154(b) by 526 days.

(21) Appl. No.: 12/284,703

(22) Filed: Sep. 24, 2008

Related U.S. Application Data

(60) Provisional application No. 60/995,040, filed on Sep. 24, 2007.

(51) Int. Cl.
*H04W 24/00* (2009.01)

(52) U.S. Cl. ........... 455/456.1; 705/28; 705/22; 705/23; 705/333; 701/213; 455/456.2; 455/456.3; 455/456.4; 455/456.5; 455/456.6

(58) Field of Classification Search .... 455/456.1–456.6, 455/574, 127.5, 466, 41.2, 461; 705/1, 6–8, 705/22, 25–28; 342/357; 340/531, 539.22, 340/572.1

See application file for complete search history.

(56) References Cited

U.S. PATENT DOCUMENTS

| | | | |
|---|---|---|---|
| 5,642,398 A | 6/1997 | Tiedemann | |
| 6,002,936 A | 12/1999 | Roel-Ng | |
| 6,094,642 A * | 7/2000 | Stephenson et al. | 705/28 |
| 6,097,958 A | 8/2000 | Bergen | |
| 6,385,458 B1 | 5/2002 | Papadimitriou | |
| 6,502,030 B2 * | 12/2002 | Hilleary | 701/207 |
| 6,509,830 B1 * | 1/2003 | Elliott | 340/286.02 |
| 6,636,742 B1 | 10/2003 | Torkki | |
| 6,716,101 B1 | 4/2004 | Meadows | |
| 6,976,007 B1 * | 12/2005 | Boucher et al. | 705/28 |
| 7,013,148 B1 | 3/2006 | Ganesh | |
| 7,016,693 B2 | 3/2006 | Guyot | |
| 7,053,823 B2 * | 5/2006 | Cervinka et al. | 342/357.31 |
| 7,116,990 B2 | 10/2006 | Maanoja | |
| 7,123,141 B2 * | 10/2006 | Contestabile | 340/539.13 |
| 7,171,187 B2 * | 1/2007 | Haave et al. | 455/404.2 |
| 7,212,113 B2 * | 5/2007 | Zanovitch | 340/540 |
| 7,212,829 B1 * | 5/2007 | Lau et al. | 455/456.1 |
| 7,224,986 B2 | 5/2007 | Nikolai | |
| 7,253,731 B2 | 8/2007 | Joao | |
| 7,283,827 B2 | 10/2007 | Meadows | |
| 7,313,631 B1 | 12/2007 | Sesmun | |
| 7,321,768 B2 | 1/2008 | Armbruster | |
| 7,342,497 B2 * | 3/2008 | Chung et al. | 340/572.1 |
| 7,567,207 B2 * | 7/2009 | Angus | 342/357.72 |
| 7,574,447 B2 * | 8/2009 | Cornelius | 1/1 |
| 7,684,994 B2 * | 3/2010 | Kodger, Jr. | 705/333 |
| 7,797,367 B1 * | 9/2010 | Gelvin et al. | 709/200 |
| 7,865,408 B2 * | 1/2011 | Bhadra | 705/28 |
| 2001/0040506 A1 * | 11/2001 | Boulay et al. | 340/539 |
| 2002/0095306 A1 * | 7/2002 | Smith et al. | 705/1 |
| 2002/0123353 A1 * | 9/2002 | Savoie | 455/456 |

(Continued)

*Primary Examiner* — Jean A Gelin
*Assistant Examiner* — Nathan Taylor

(57) ABSTRACT

A method and system of Passive Mode Tracking of an item, object or cargo associated with a wireless communication device through existing and future wireless networks is described. The method builds on the observation that for many applications, cargo tracking included, an exact GPS or comparable accuracy method of location is not always necessary, however, the progress or rough movement, is. Therefore it is possible to utilize the tracking units' geographical location based on the registration process of a wireless service and its associated networks to locate the tracking unit. This method improves the size, weight, power consumption and complexity of the tracking unit by removing work from the tracking unit and utilizing the information collected by the wireless system(s) and the network(s) it attaches to. The location of the tracking unit is determined by inquiring of the wireless network the location of the wireless communication device.

5 Claims, 1 Drawing Sheet

U.S. PATENT DOCUMENTS

| | | | |
|---|---|---|---|
| 2003/0050038 A1* | 3/2003 | Haave et al. | 455/404 |
| 2004/0192353 A1* | 9/2004 | Mason et al. | 455/457 |
| 2005/0024202 A1* | 2/2005 | Culpepper et al. | 340/539.13 |
| 2005/0128074 A1* | 6/2005 | Culpepper et al. | 340/539.1 |
| 2005/0234641 A1* | 10/2005 | Marks et al. | 701/213 |
| 2006/0109106 A1* | 5/2006 | Braun | 340/539.13 |
| 2006/0229895 A1* | 10/2006 | Kodger | 705/1 |
| 2007/0139189 A1* | 6/2007 | Helmig | 340/539.13 |
| 2007/0190943 A1* | 8/2007 | Little | 455/41.2 |
| 2007/0210914 A1* | 9/2007 | Brosius | 340/531 |
| 2007/0268138 A1* | 11/2007 | Chung et al. | 340/572.1 |
| 2008/0061963 A1* | 3/2008 | Schnitz et al. | 340/539.13 |
| 2008/0262646 A1* | 10/2008 | Breed | 700/226 |
| 2008/0309722 A1* | 12/2008 | Silverbrook | 347/47 |
| 2009/0115609 A1* | 5/2009 | Weaver | 340/572.1 |
| 2009/0224892 A1* | 9/2009 | Nicholls | 340/10.42 |
| 2009/0309722 A1* | 12/2009 | Nichols et al. | 340/541 |
| 2010/0057596 A1* | 3/2010 | Sundel | 705/31 |
| 2010/0076902 A1* | 3/2010 | Kraft | 705/333 |
| 2010/0138355 A1* | 6/2010 | Kodger, Jr. | 705/333 |
| 2010/0205187 A1* | 8/2010 | Bertagna | 707/756 |

* cited by examiner

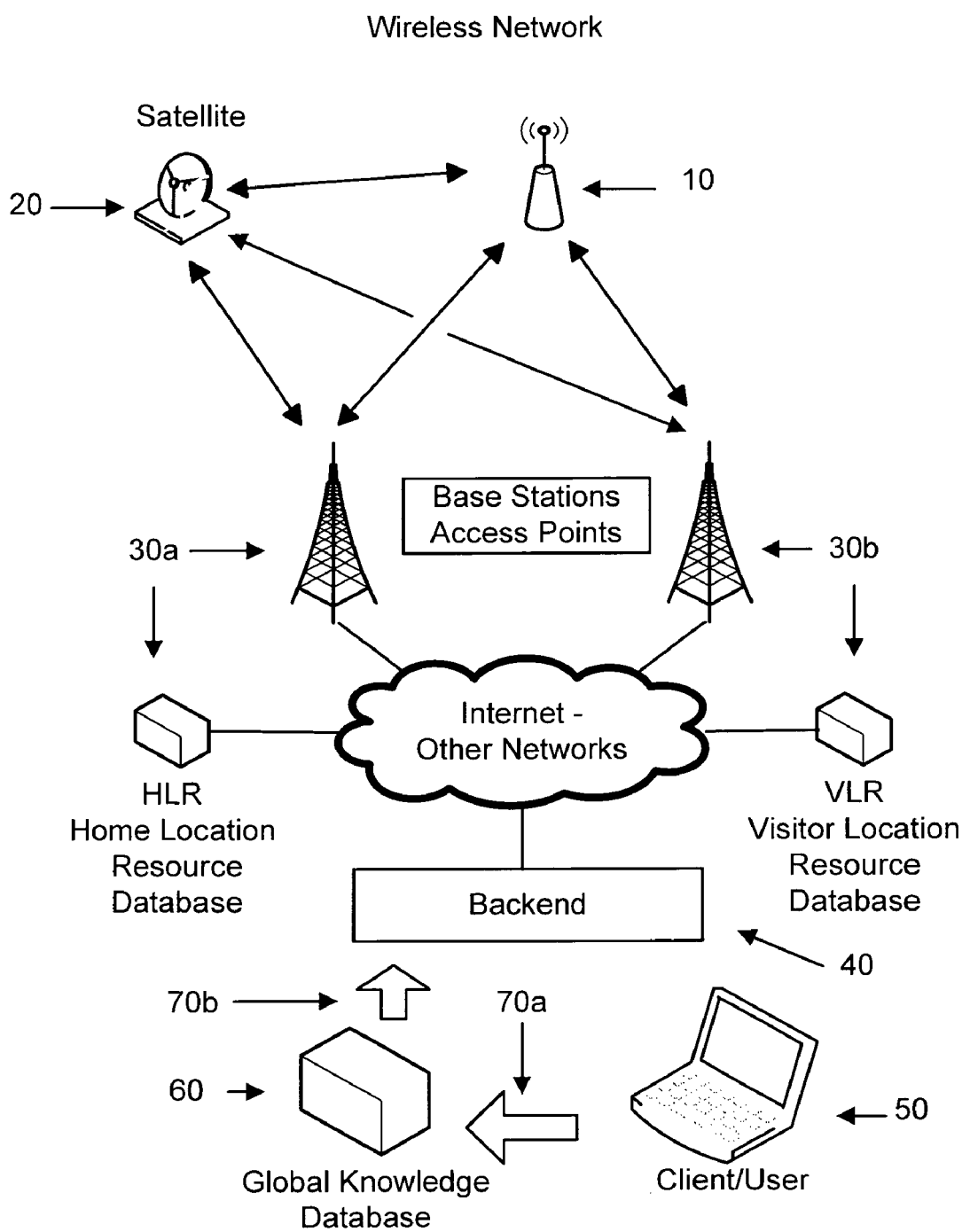

PASSIVE MODE TRACKING THROUGH EXISTING AND FUTURE WIRELESS NETWORKS

CROSS-REFERENCE TO RELATED APPLICATIONS

This application claims the benefit of U.S. Provisional Application Ser. No. U60/995,040 filed Sep. 24, 2007 by the present patent applicant.

FEDERALLY SPONSORED RESEARCH

Not Applicable

SEQUENCE LISTING

Not Applicable

FIELD OF THE INVENTION

The following disclosure relates to wireless communication systems and more specifically to a power efficient method for the conservation of energy in wireless data collection and communication when tracking items, packages, cargo and other assets utilizing the infrastructure of networks.

BACKGROUND OF THE INVENTION

Tracking and monitoring the location, movement and health of items, objects and cargo can be done in several ways. The conventional state of the art in location tracking and telemetry is based upon the tracking unit determining its health and location by executing local tasks on the tracking unit and communicating the results, either on request or independently, based on time or internal rules, through the network to the backend system.

To perform even elementary tasks and have communication capabilities requires location devices, transmitters and receivers, algorithms and/or methods to be implemented on the tracking unit, usually as a combination of hardware and software. These requirements have a negative impact as it increases the size, weight, power and cost of the tracking unit. It also continues to contribute to the unnecessary amount of data transmitted over the wireless network, again, imposing power and monetary costs of transmission. In addition, when a tracking unit is operating in an area where a home network is not available, significant additional charges may apply for connection to the available network as well as costs for transmitting data.

As an example; when tracking the health and progress of transport of cargo or items sometimes across multiple modes of transportation, the tracking units need to be small enough to be concealed within or attached to the items, they cannot rely on a clear view of the sky, nor can they rely on satellite communication capabilities (when tracking items and pallets as opposed to trucks and trailers items will be inside cargo holds and buildings). Furthermore, they must be able to operate in the field for long periods of time (preferably at least the time for a roundtrip transport plus a margin). In addition to providing geographical location, the unit(s) must also provide health information of the packages tracked, which is dependent on the actual items monitored

SUMMARY OF THE INVENTION

The method described utilizes the system and methods of existing networks to perform many of the tasks and the communications conventionally assigned to the tracking unit, such as determining the tracking units' location and health status, location, travel and projected routes, measured and stored data information, and answering requests from users tracking the unit. Additionally, in some cases the mobile device may be required to change its behavior. This behavioral change may be for any number of reasons such as for power savings or to meet regulatory requirements, such as onboard aircraft, etc. The method builds on the observation that for many applications (cargo tracking included) an exact GPS position is not always necessary, however, the progress or, rough movement, is.

In many situations, it is difficult to acquire a satellite signal inside cargo holds and buildings, however, the terrestrial systems, Cellular systems, WiFi, VII as well as systems mounted on the transports themselves have much higher signal levels and are significantly easier to reach. In order to determine what is going on in a transport, many factors besides the "local health" provided by the sensors on the items and its geological position or motion are important, for example, the historical information from previous transports, airline schedules, shipment-routes, terminal locations, etc. This information and much more is available on the internet side providing an almost infinite power and information processing capabilities.

In most networked systems such as GSM telephony systems or internet systems, there is a notion of where a tracking unit is located based the registration process built into the systems and on the route messages used to get to the unit or base station, the access point or last router association. This built in registration process can be utilized with little, if any, involvement of the application processor on the mobile device. Wide Area or Local Area networks utilized in these settings including but not limited to GSM, 3G or other mobile phone technologies and Wireless LAN technologies, including but not limited to 802.11 and others, can ascertain the rough location of tracking units through their networks registration process, or in a similar manner. Therefore, we can utilize a system which determines a tracking units' location based on the registration process of the tracking unit and its associated networks and/or the messages route to the tracking unit.

This results in significant power savings and reduces the tracking units' need for certain costly devices and computational power. For example, a smaller less complex CPU may be sufficient and location determining hardware and software may not need to be installed, power supplies may be reduced, each of which will reduce the size, weight, power and cost of the tracking unit.

By using the network location instead of communicating a "computed location," transmission costs are reduced. In fact, a more continuous tracking and health monitoring can be achieved. For example, in a GSM system, the Home Location Resource (HLR) entity contains information about how to reach the unit and whether the tracking unit is alive. As the tracking unit moves around the world and connects to different base-stations, the HLR receives updates. When the tracking unit is out of its home network area, another entity, the Visitor Location Resource (VLR) becomes involved which then contains information about the tracking unit in the foreign network. The backend can now just query the HLR/VLR about the tracking unit to determine its network location and health. It is possible to subscribe to the HLR for change events; the HLR would send messages when a unit is lost or has changed position and for similar reasons.

In most cases the networks notion of location is not necessarily a physical location, however, this information can be derived. For example in a GSM system the base-station identification (operator code, area code, cell or access point identification) defines a particular base station with antennas located at a "tower". By looking up the tower location, for example in the Federal Communications Commission tower database, the physical location of the base-station and thus the location of the tracking unit can be derived.

In essence, the method employs the network's knowledge of the tracking unit location to track it and to determine its presence and health by querying the network about the tracking unit. Using this method the tracking unit would then only need to communicate location and collected and appended information as a direct answer to a query to the tracking unit, or when business-logic at the tracking unit and/or associated sensors requires it, such as in the event of an alarm or similar event.

The use of backend assisted tracking and external information gathering enables better functionality and behavioral modifications on the tracked device's side, adapting its behavior to the situation at hand or to regulatory requirements and to future situations enabling better power management and behavior fit to the actual situation and the tracking purpose at the time. Examples of such behavioral modifications could be adapting the behavior of the system at certain locations, such as airports, and of adapting communication attempts/registration attempts based on the predicted presence of available network coverage.

This method also includes the use of the tracking unit as a part of a finer level of positioning of the unit. At certain points or in certain situations (determined by business logic) a more accurate determination of position may be required. In this case the network system would request assistance from the tracking unit in terms of a list of known access points with associated information such as received power level or other information at the time. This information with potential other information available can then be used in the backend to better determine the units actual geographical position. If even finer grain positioning is needed, the 911 positioning service enabled in some networks could be used or as a final step the unit could be utilizing a GPS or similar positioning capability onboard.

With this method of fall-back (actually increased precision with greater effort) the units' effort of positioning would be minimized while the precision of positioning would be available when needed or requested.

The method improves the size, weight, power consumption, and complexity of the tracking units in the field by moving most of their work onto the backend system and the networks that it attaches to. The method reduces the cost of the tracking itself by not needing to setup formal communication and data transfers over the networks, but instead use "network control" information as the information source. The method also improves the potential for much richer and more real-time tracking and health information by the vast resources that are available on the backend side of the system. The derived information to the user (or internal to the system) could even be based on a fusion of the information from other units in the field, or other units that have traversed the same area at a different point in time (watermark/footprint/track) to enhance the tracking information about the current situation.

This method makes it possible to track items in real-time in an uncooperative environment without the loss of tracking at transition points. It also improves the size, weight, power consumption and complexity of the tracking unit by removing work from it an utilizing the information collected by the wireless networks it attaches to while putting the burden of determining the health and actions to the backend system on the network. The information collected and produced by the system is then made available to users either as maps with location data, but more commonly as simply health information when requested and alerts when needed, for example, by SMS, email, a phone call or numerous other methods.

DRAWINGS

Brief Description of the Figures

FIG. 1 is a functional front perspective of a wireless network.

DETAILED DESCRIPTION OF THE FIGURES

FIG. 1 is a front perspective of a wireless network. Innumerable possibilities and potentials exist in types of communication, devices and paths with this method. This drawing shows an extremely simplistic example of the tracking method. The Tracking Unit (10) is shown with multi-path communication ability. A satellite (20) is shown as a possible communication link. The HLR (Home Location Resource) Base station and Database (30*a*) are shown with multi-path communication ability. The VLR (Visitor Location Registration) Base station and Database (30*b*) are shown with multi-path communication ability. The Backend System (40) is shown, comprised of the HLR, VLR, GKD (Global Knowledge Database), Client/User and actions. The Client/User (50) is shown initiating a query via a laptop. The GKD (Global Knowledge Database) (60) is shown forwarding the Query from the Client/User to the various components of the backend system. The Query Start at Client/User (70*a*) shows the origination point and path of a specific query and the Query (70*b*) shows the continued path of the query.

REFERENCE NUMERALS

10 Tracking Unit
20 Satellite
30*a* HLR Home Location Resource
30*b* VLR Visitor Location Resource
40 Backend System
50 Client/User
60 GKD-Global Knowledge Database
70*a* Query Start
70*b* Query Path Questions

DETAILED DESCRIPTION AND OPERATION OF THE INVENTION

As this method conveys the tasks and communication to the backend system (40), the backend may advise the tracking unit (10) about proper behavior based on the GKD, Global Knowledge Database, (60) about the tracking units (10) location/situation. One possibility would be if there are no available networks within range for the next few hours (of estimated travel), it is no use for the unit (10) to be searching for one and the backend (40) can advise the unit (10) not to search. Regulatory or other reasons may require the tracking unit (10) to behave in a particular manner, such as at an airport or in an aircraft during flight. The backend (40), better understanding what the unit (10) should be doing, may advice the unit (10) to modify its behavior. Additional information such as Google maps can be used to determine airport location, U.P.S. schedules used for trucking, airline schedules for flights, and packet routing information could be used for hand-offs etc. Third party information could readily be considered by the backend (40).

Additionally, with this method, the business logic can be (infinitely) complex due to the fact that backend communication, computational resources, programming tools and information resources are available at costs (in aspects of availability, cost of access etc) orders of magnitude less than at the tracking unit. The tracking history may be matched with expected track information about roads, topological or other factors that may affect reception in an area. The type (including terrain models and city topological and building information) of environment the unit is traveling in may be incorporated into decisions, estimation and tracking process. By utilizing this additional information, better estimations concerning the units tracking can be ascertained than is possible if the unit was doing the work itself. In addition "advising" the unit of the "best" behavior based on global data the unit can work more efficiently.

The registration process that exists in conventional method would remain. However, the method maximizes this inherent process. The registration process between a wireless unit with a Base Station/Network (30*a*) and or a Foreign network (30*b*) generates messages and updates the HLR (30*a*) and/or the VLR (30*b*) information. By monitoring these entries, a virtual real-time tracking and health status of the unit (10) can be determined. By reducing the exchange or transmission of information, this method obtains a real time track of the unit (10) while minimizing network traffic and power consumed at the tracking unit.

Also, physical location of the unit may be determined by determining the location of the current base-station or access point, potentially combined with the history of base-station connections. If network assist is enabled (911 location services or similar) this could be used to further pinpoint the unit location. The unit could also provide information concerning the Base-Stations or access points (30*b*) it sees and their relative signal strength which again further pinpoints the unit's location.

Health information can also be determined by the registration processes, as well as the "un-registration" or other lost messages in the network itself. The units' radio will maintain connection to the network and no messages (other than control information) will be sent. However, when the HLR/VLR (30*a*)/(30*b*) determines the unit is lost/dropped, it will update the network. Loss of communication may occur if there isn't an access point (30*a*)/(30*b*) in the vicinity. The backend (40) could easily map their locations through various methods, such as the FCC database, to approximate locations or if none are within range, decide if the situation is acceptable.

DESCRIPTION AND OPERATION OF ALTERNATIVE EMBODIMENTS

Other methods of operation are possible with the method (by observing that finer grain location determination might be needed at certain times but not always) a unit (10) may be in the "passive/network" tracking mode until it is requested to determine its location by the backend system (40) or when business logic in the network determines that a finer grain position is required and communicated. As an example, a tracking unit (10) using a GSM modem, but not limited to a GSM modem as its communication device, would have the modem in "standby mode". In this mode the device would periodically go out and look for networks. When it is found, registration would be completed and the unit would remain with that access-point until another change is required. The tracking unit would then reregister with a new access-point This process is very efficient, more than an order of magnitude more power efficient than other methods, and doesn't require any additional logic at the tracking unit.

The method is easily scalable to future needs. The GSM example used above, as others may be, is easily transferred to the next generation Mobile Phone and Data networks, such as the 3G networks as well as current Wireless LAN/WAN type network such as 802.11 (Wi-Fi) and Wi-Max and future variants and versions. The adaptation capabilities are based upon the fact that for a unit (10) to be contacted within the network, the network will need to know how to route information to the tracking unit. Therefore, the location of the tracking unit (10) can be determined by the "virtual" or physical location of, the last (or last known) access-point (30*a*)/(30*b*).

CONCLUSION, RAMIFICATIONS AND SCOPE OF INVENTION

The method is not dependent on specific technologies and components of the current process. Rather, it is a method that will continue to perform through various changes that have and will occur as the location, and telemetry tracking field continues to evolve.

For example, wireless units may be manufactured with many different materials, modes of functions, technologies, components, etc. The tracking unit may communicate in various manners with other pieces within a network. The unit (10) functions with my method and, with the same method, the unit will continue to function in future variations of technologies. The various components within the wireless network are also manufactured and utilized in many different manners. The herein stated method will still outperform the conventional state of the art in the field. This method can be applied to multiple application areas such as cargo and parcel applications and with the small size and weight down to letter tracking applications are possible. The stated method is not limited to the above stated applications, almost any application of tracking, theft recovery and monitoring of any kind of device or person anytime, anyplace, anywhere that a wireless network can be reached (globally but not limited to planetary applications) can be enhanced by using it. Furthermore, with its adaptive behavior and behavior assist, tracking-time or tracking-at places previously not accessible will be possible. For example, commercial aircraft in flight might be one application. By combining the method of tracking and health information with a measurement application (and/or) a sensor or sensor network in and around the tracking device, a much more effective way of providing telemetry data can be achieved.

GLOSSARY AND TERMS

1. Tracking Unit is defined as the device in the field that is being "tracked" in that the geographical or similar position is to be known by a third-party. In our system it also may include other information such as the health of the items being tracked or monitored (including but not limited to information about temperature, humidity, light, shaking, shock, vibration, $CO_2$, $NO_x$, tampering, door or case status etc. and alarms based upon the before mentioned measurements)

2. Tracking: The process of determining a units "location" over time, either at specific intervals or when needed, so that information about its whereabouts can be extracted. In our system we also include the potential of retrieving additional information from the unit, for example the temperature and humidity around it, or the health status of the unit.

3. Telemetry: Measuring something remotely. That translated to our system acquiring data from the surrounding of the remote units, potentially store it there, process it, but ultimately transferring data or results to another location.

4. Backend System is used as a general term in describing an entities "backend" which exists on the network side of the system. This "Backend" is responsible for storing data, processing data and managing units in the field. It can be implemented as one or many distinct units but the essence of it is a point where data is aggregated, processed and redistributed to stakeholders.

5. Global Knowledge Database: By this we mean an abstract entity (implemented as one or more physical entities in hardware and or software present somewhere with connection to the internet) This entity has "contained" the knowledge about the situation of the tracked unit. This knowledge is based on an aggregation of pieces of information gathered from various information sources that together result in the aggregate knowledge about the status and position of the tracked device. Users query this entity (or an entity connected to it) about information on the tracked unit and its associated items.

6. Access-point and Base-station are used almost synonymously describing an entity that controls the entry to a network. It generally consists of a radio and an access mechanism to get into the network in question. In a GSM network, it in reality consists of multiple units, but the work essentially enables the tracking unit to access the network via its radio. In a WiFi, the same (essentially) work is accomplished by what is called an access-point.

7. Application processor is used in the meaning of the processing entity (or entities) that execute the tracking application code, not directly used to implement the radio device itself. This application processor can in some instances share the same processor as the radio device.

8. FAA refers to the US Federal Aviation Authority and the DO-xxx refers to FAA/RTCA Document numbers for recommended practices.

9. FCC refers to the Federal Communications Commission

10. Uncooperative in the context of tracking we mean that the process of tracking is done without the active help/assistance of the entities moving the items, it may also mean that they do not know that items they carry are tracked in the first place. Furthermore in our system it also means that there is no additional requirement for equipment being installed on the cargo carrying devices such as aircraft, containers, trucks, trailers etc.

11. Health monitoring, with health monitoring we mean the process of measuring things on an item to determine if it has been compromised. This can include measuring temperature, humidity, chock, vibration, but also detecting tampering, such as unauthorized opening of packages or seals being broken, the values of those measurements sometimes over time or combined then determines the health of the item.

What is claimed is:

1. A power efficient method for wireless remote health monitoring and tracking of items across multiple modes of transportation using existing wireless infrastructures; wherein the method comprises:
registering a wireless radio tracking device located with tracked items using an application processor on a network through a base station to facilitate location and health determination;
determining by the backend system of the network, utilizing appropriate software and accessing databases, the health and location of items tracked wherein progress information of the items tracked is stored in a database; and providing the progress information to authorized users, through an access point via at least one of the internet, web-service, email, SMS, or automated phone calls;
wherein determining the health and location of tracked items comprises:
obtaining a rough geographical location of tracked items, comprising: retrieving from a network database or from stored cell-tower location information in the backend system a rough geographical position of the tracked items and providing a rough estimate of the location of the wireless radio tracking device within 1.5 miles or less, wherein the network comprises a cellular network;
obtaining a finer geographical location resolution, when requested by the application processor on the wireless tracking device; wherein obtaining a finer location resolution comprises: augmenting the rough geographical location information by sending additional data about the surrounding base stations and recent historical base station information; wherein recent historical base station information comprises: the base stations or networks to which the wireless radio tracking device is connected, the radio networks or bases stations detected by the wireless radio tracking device and global positioning location data of the wireless radio tracking device;
if the network comprises a WiFi network in combination with the cellular network, obtaining a rough geographical location of tracked items additionally comprises: determining of a geographical location by the wireless radio tracking device; sending one data packet to the backend system; retrieving by the backend system the access point location by looking up the IP address location of the access-point, or requesting the access point location from the operator or third party location provider; and providing a rough estimate of the location of the wireless radio tracking device within 3 miles or better accuracy;
if the network comprises a LTE or VII network in combination with the cellular network, obtaining a rough geographical location of tracked items additionally comprises: requesting by the tracking unit location information of the local access point; sending an information package to the backend system including the location information;
wherein determining the health and location of tracked items further comprises:
retrieving, other information, which is not from the wireless radio tracking unit or the network, the other information comprising:
known schedules for carriers of the tracked items, wherein the schedules for carriers of the tracked items comprise at least one of shipping company schedules, and airline schedules;
Federal Aviation Administration (FAA) data, flight tracking information and airport location;
locations of known sorting and reloading facilities wherein the locations of known sorting and reloading facilities includes at least one of locations of airports and major on the road work sites;
historical data from previous transports on the same or similar route;
fusing the other information with the geographical location of the tracked items;
using the additional information and the geographical location to determine the health and location of items currently being tracked and future tracked items;

wherein using the additional information to determine the health and location of items currently being tracked and future tracked items comprises: wherein the other information that is retrieved further comprises known schedules, determining when expected pickup time is past due using the additional information including known schedules and triggering an alarm regarding the health an location of tracked items;

wherein using the additional information to determine the health and location of items currently being tracked and future tracked items comprises: wherein other information that is retrieved further comprises: weather data, determining possible delays in transports using the additional information including weather data and raising alert levels regarding the health and location of tracked items for possible item damage due to hot, cold, or damp conditions;

wherein using the additional information to determine the health and location of items currently being tracked and future tracked items comprises: wherein other information that is retrieved further comprises: airline schedules, flight tracking information and airport location determining if the tracked items missed the expected flights and triggering an alarm regarding the health an location of tracked items;

wherein using the additional information to determine the health and location of items currently being tracked and future tracked items comprises: wherein other information that is retrieved further comprises: historical data from previous transports on the same or similar route, comparing current tracked items progress and routing, measuring the current items progress relative to the historical data and detecting anomalies regarding the tracked items progress using the historical data.

2. The method of claim 1 further comprising: changing the wireless radio tracking device behavior based on the current environment and prediction of the future environment wherein the current environment or future environment of the wireless radio device is determined based on local data and information provided by the backend system; and wherein the current environment or future environment is one of: airport, inside closed metal containers, warehouse, storage/transfer facilities and locations where no connection signal is expected;

determining, by the back end system, where the wireless radio device is located, a predicted path and environment going forward and devising an appropriate behavior for the wireless radio tracking device relative to the location and environment;

wherein devising the appropriate behavior for the wireless radio tracking device comprises, when the environment is a airport or aircraft, the wireless radio tracking device behavior is modified to guarantee that the external transmitters are turned off when required by regulations and that the device comply with FAA DO-182, DO-294/FCC recommendations for portable electronic devices aboard aircraft;

wherein devising the appropriate behavior for the wireless radio tracking device further comprises: using multiple external sensors to ensure the-transmitters are powered down when it is unsafe to operate; turning transmitters of the wireless radio tracking device back on from aircraft mode so it safely can return to normal operation when on the ground based on external sensor information; wherein the external sensor information comprises at least one of acoustics engine sound, altitude, motion, lack of motion and rapid deceleration;

wherein devising the appropriate behavior for the wireless radio tracking device comprises causing causes a power down of the radio devices for a certain period of time, in order to save power, or better conceal the device;

wherein devising the appropriate behavior for the wireless radio tracking device comprises causing the wireless radio tracking device to connect to an aircraft communication or passenger WiFi system when it is safe to do so, and communicate with the backend system;

wherein devising the appropriate behavior for the wireless radio tracking device comprises causing the wireless radio tracking device to wake-up from a powered down state if some pre-set condition is true even if the device is in a low-power mode, wherein the pre-set condition is at least one of a phone call or a sensor attached to the wireless radio device registers an event; wherein a sensor registering an event causes the tracking device to wake-up even if a units wireless modem of the wireless radio tracking device is turned off;

wherein devising the appropriate behavior for the wireless radio tracking device comprises: processing the event registered by the sensors by the application processor of the wireless radio tracking device; and transmitting event information to the backend system, wherein that sensors include least one of: shock, vibration, magnetic contact, external current or voltage loop, light, and motion; and the sensors have set limits on when to register an event.

3. The method of claim 2, wherein the wireless radio tracking device is capable of "real time" item tracking and detects tampering using sensors associated with the wireless radio tracking device which trigger an alarm that is sent to the backend system; and wherein the wireless radio tracking device is concealed within the tracked items due to the size of the wireless radio tracking unit, wherein the operational time of the wireless radio tracking device is field is more than 14 days.

4. A power efficient system for wireless remote health monitoring and tracking of items across multiple modes of transportation using existing wireless infrastructures comprising a wireless radio tracking device, and a backend system wherein in the wireless radio tracking device comprises: a rugged enclosure; a radio device; an application processor; at least one sensor; and a battery pack or alternate power source; and the backend system comprises appropriate software and databases;

wherein the wireless radio tracking device is located with tracked items and registers using an application processor on a network through a base station to facilitate location and health determination;

backend system of the network comprises a determining unit which determines, utilizing appropriate software and accessing databases, the health and location of items tracked wherein progress information of the items tracked is stored in a database; and providing the progress information to authorized users, through an access point via at least one of the internet, web-service, email, SMS, or automated phone calls;

wherein determining the health and location of tracked items comprises:

obtaining a rough geographical location of tracked items, comprising: retrieving from a network database or from stored cell-tower location information in the backend system a rough geographical position of the tracked items and providing a rough estimate of the location of the wireless radio tracking device within 1.5 miles or less, wherein the network comprises a cellular network;

obtaining a finer geographical location resolution, when requested by the application processor on the wireless tracking device; wherein obtaining a finer location resolution comprises: augmenting the rough geographical location information by sending additional data about the surrounding base stations and recent historical base station information; wherein recent historical base station information comprises: the base stations or networks to which the wireless radio tracking device is connected, the radio networks or bases stations detected by the wireless radio tracking device or global positioning location data of the wireless radio tracking device;

if the network comprises a WiFi network combination with the cellular network, obtaining a rough geographical location of tracked items additionally comprises: determining of a geographical location by the wireless radio tracking device; sending one data packet to the backend system; retrieving by the backend system the access point location by looking up the IP address location of the access-point, or requesting the access point location from the operator or third party location provider; and providing a rough estimate of the location of the wireless radio tracking device within 3 miles or better accuracy;

if the network comprises a LTE or VII network in combination with the cellular network, and obtaining a rough geographical location of tracked items additionally comprises: requesting by the tracking unit location information of the local access point; sending an information package to the backend system including the location information;

wherein determining the health and location of tracked items further comprises:

retrieving, other information, which is not from the wireless radio tracking unit or the network, the other information comprising:
  known schedules for carriers of the tracked items, wherein the schedules for carriers comprise at least one of shipping company schedules, and airline schedules;
  Federal Aviation Administration (FAA) data, flight tracking information and airport location;
  locations of known sorting and reloading facilities wherein the locations of known sorting and reloading facilities includes at least one of locations of airports and major on the road work sites;
  historical data from previous transports on the same or similar route;
fusing the other information with the geographical location of the tracked items;
using the additional information to determine the health and location of items currently being tracked and future tracked items;
  wherein using the additional information to determine the health and location of items currently being tracked and future tracked items comprises: wherein the other information that is retrieved further comprises: known schedules, determining when expected pickup time is past due using the additional information including known schedules and triggering an alarm regarding the health an location of tracked items;
  wherein using the additional information to determine the health and location of items currently being tracked and future tracked items comprises: wherein other information that is retrieved further comprises: weather data, determining possible delays in transports using the additional information including weather data and raising alert levels regarding the health and location of tracked items for possible item damage due to hot, cold, or damp conditions;
  wherein using the additional information to determine the health and location of items currently being tracked and future tracked items comprises: wherein other information that is retrieved further comprises: airline schedules, flight tracking information and airport location determining if the tracked items missed the expected flights and triggering an alarm regarding the health an location of tracked items;

wherein using the additional information to determine the health and location of items currently being tracked and future tracked items comprises: wherein other information that is retrieved further comprises: historical data from previous transports on the same or similar route, comparing current tracked items progress and routing, measuring the current items progress relative to the historical data and detecting anomalies regarding the tracked items progress using the historical data.

5. The system of claim 4 further comprising changing the wireless radio tracking device behavior based on the current environment and prediction of the future environment wherein the environment or future environment if the wireless radio device is determined based on local data or information provided by the backend system; and wherein the environment is one of: airport, inside closed metal containers, warehouse, storage/transfer facilities and locations where no connection signal is expected;

determining, by the back end system, where the wireless radio device is located, a predicted path and environment going forward and devising an appropriate behavior for the wireless radio tracking device relative to the location and environment;
    wherein devising the appropriate behavior for the wireless radio tracking device comprises, when the environment is a airport or aircraft, the wireless radio tracking device behavior is modified to guarantee that the external transmitters are turned off when required by regulations and that the device comply with FAA DO-182, DO-294/FCC recommendations for portable electronic devices aboard aircraft;
    wherein devising the appropriate behavior for the wireless radio tracking device further comprises: using multiple external sensors to ensure the-transmitters are powered down when it is unsafe to operate; turning transmitters of the wireless radio tracking device back on from aircraft mode so it safely can return to normal operation when on the ground based on external sensor information; wherein the external sensor information comprises at least one of acoustics engine sound, altitude, motion, lack of motion and rapid deceleration;
    wherein devising the appropriate behavior for the wireless radio tracking device comprises causes a power down of the radio devices for a certain period of time, in order to save power, or better conceal the device;

wherein devising the appropriate behavior for the wireless radio tracking device comprises causing the wireless radio tracking device to connect to an aircraft communication or passenger WiFi system when it is safe to do so, and communicate with the backend system;

wherein devising the appropriate behavior for the wireless radio tracking device comprises causing the wireless radio tracking device to wake-up from a powered down state if some pre-set condition is true even if the device is in a low-power mode, wherein the pre-set condition is at least one of a phone call or a sensor attached to the wireless radio device registers an event; wherein a sensor registering an event causes the tracking device to wake-up even if a units wireless modem of the wireless radio tracking device is turned off;

wherein devising the appropriate behavior for the wireless radio tracking device comprises: processing the event registered by the sensors by the application processor of the wireless radio tracking device; and transmitting event information to the backend system, wherein that sensors include least one of: shock, vibration, magnetic contact, external current or voltage loop, light, and motion; and the sensors have set limits on when to register an event.

* * * * *